United States Patent [19]

Rasberger et al.

[11] 4,297,492
[45] Oct. 27, 1981

[54] PHENOLIC-1,3,5-TRIAZINES

[75] Inventors: Michael Rasberger; Siegfried Rosenberger; Samuel Evans, all of Riehen, Switzerland

[73] Assignee: Ciba-Geigy Corporation, Ardsley, N.Y.

[21] Appl. No.: 128,987

[22] Filed: Mar. 10, 1980

[30] Foreign Application Priority Data

Mar. 23, 1979 [CH] Switzerland .................... 2739/79

[51] Int. Cl.³ .................. C07D 251/46; C07D 251/48; C07D 251/70; C07D 251/26

[52] U.S. Cl. .................................... 544/211; 542/412; 544/195; 544/214; 544/197; 544/198; 544/208; 544/209; 544/212; 544/219

[58] Field of Search ............... 544/211, 195, 214, 197, 544/198, 208, 209, 212, 219; 542/412

[56] References Cited

U.S. PATENT DOCUMENTS 3,978,028  8/1976  Sundermann ................. 260/248 CS
4,049,630  9/1977  Sundermann et al. ........... 260/47 R
4,086,204  4/1978  Cassandrini et al. .......... 260/45.8 NT

*Primary Examiner*—John M. Ford
*Attorney, Agent, or Firm*—Harry Falber

[57] ABSTRACT

Novel oligomeric and polymeric phenolic 1,3,5-triazines, for example those of the formula

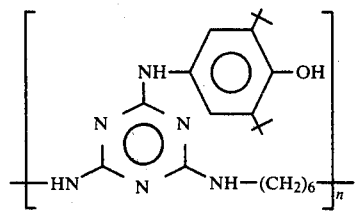

their preparation and their use for stabilizing organic material and also the organic material protected against oxidative and light-induced degradation with the aid of these compounds.

8 Claims, No Drawings

PHENOLIC-1,3,5-TRIAZINES

The present invention relates to novel oligomeric or polymeric phenolic 1,3,5-triazines, their preparation and their use for stabilising organic material, and to the organic material protected against oxidative and light-induced degradation with the aid of these compounds.

Phenolic 1,3,5-triazines which are suitable as antioxidants have already been disclosed in U.S. Pat. No. 3,255,191. However, these compounds have the disadvantages that they migrate and are fairly easily extractable from the organic material.

Novel oligomeric and polymeric phenolic 1,3,5-triazines have now been found which, coupled with a good stabilising action, additionally display a surprisingly lower degree of migration and are significantly less extractable.

The novel compounds have the general formula I

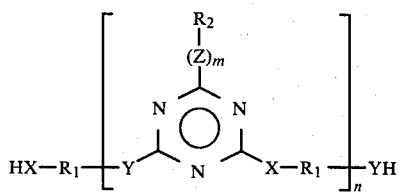

in which X, Y and Z independently of one another are $-O-$, $-S-$ or $-N(R_3)-$, in which $R_3$ can be hydrogen, $-NH_2$, $C_1-C_{18}$ alkyl, $C_2-C_{18}$ oxaalkyl, $C_2-C_{18}$ thiaalkyl, $C_3-C_6$ alkenyl, $C_3-C_4$ alkynyl, $C_5-C_{12}$ cycloalkyl, $C_6-C_{14}$ aryl, which is unsubstituted or substituted by $C_1-C_8$ alkyl, or $C_7-C_{18}$ aralkyl, which can be substituted in the aryl moiety by $-OH$ and $C_1-C_8$ alkyl, $R_1$ is $C_2-C_{18}$ alkylene which can be interrupted by one or two $-O-$, $-S-$ or $-COO-$ or by one $-O-P(R_4)-O-$, in which $R_4$ is $C_1-C_{18}$ alkyl, allyl, cyclohexyl or phenyl, or $C_5-C_{12}$ cycloalkylene, $C_3-C_4$ alkenylene, phenylene, biphenylene, 1,4-cyclohexylenedimethylene, 1,3,3-trimethylcyclohexylene or one of the two groups of the formulae

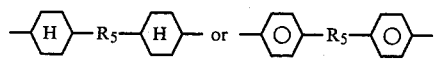

in which $R_5$ is $-O-$, $-S-$, $-NH-$ or $-(R_6)C(R_7)-$, in which $R_6$ and $R_7$ are hydrogen or $C_1-C_8$ alkyl, or $R_6$ and $R_7$ together with the C atom to which they are bonded form $C_5-C_{12}$ cycloalkylene, or, furthermore, if X and Y are $-N(R_3)-$, $R_1$ is a direct bond or, together with the two radicals $-N(R_3)-$, forms a piperazine ring which can be substituted by $C_1-C_4$ alkyl, and if X and Y are $-N(R_3)-$ or $-S-$, $R_1$ can be one of the three bivalent groups of the formulae

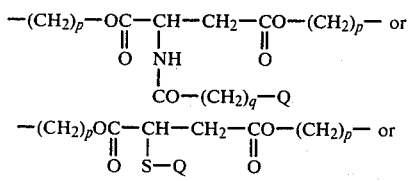

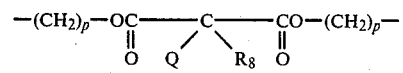

in which $R_8$ is $C_1-C_{18}$ alkyl, $C_3-C_6$ alkenyl, $C_5-C_{12}$ cycloalkyl, phenyl, benzyl or Q, and Q is a group of the formula

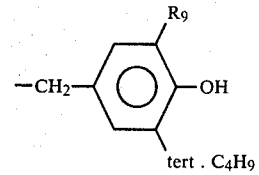

in which $R_9$ is $C_1-C_8$ alkyl, and p is the numbers 1–3 and q is the number 1 or 2, or, furthermore, if X and Y are $-O-$, $R_1$ is a group of the formula II

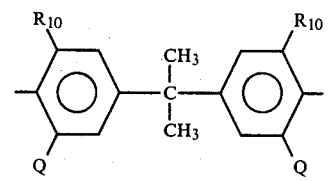

in which Q is as defined above and $R_{10}$ is $C_1-C_{18}$ alkyl, $C_3-C_6$ alkenyl, $C_5-C_{12}$ cycloalkyl, phenyl, benzyl, Q or α,α-dimethylbenzyl, and $R_2$ is hydrogen, $C_1-C_{18}$ alkyl, $C_2-C_{18}$ oxaalkyl, $C_2-C_{18}$ thiaalkyl, $C_3-C_{19}$ alkoxycarbonylalkyl, $C_3-C_6$ alkenyl, $C_3-C_4$ alkynyl, $C_5-C_{12}$ cycloalkyl, $C_6-C_{14}$ aryl, which is unsubstituted or substituted by $C_1-C_8$ alkyl, $C_7-C_{23}$ alkaryl, which can be substituted in the aryl moiety by $-OH$, or $C_7-C_{18}$ aralkyl which can be interrupted in the alkylene moiety by $-S-$ or $-COO-$ and can be substituted in the aryl moiety by $-OH$ and $C_1-C_8$ alkyl, or, if Z is $-O-$, $R_2$ can be one of the two groups of the formulae

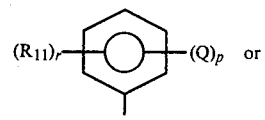

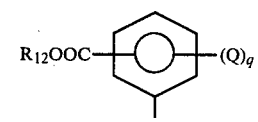

in which Q, p and q are as defined above, $R_{11}$ is $C_1-C_8$ alkyl, $R_{12}$ is $C_1-C_{18}$ alkyl or phenyl and r is the number nought, 1 or 2 and, furthermore, if Z is $-N(R_3)-$, $R_2$ is one of the two groups of the formulae $-NH-CO-CH_2-Q$ or $NH-Q$, or p-anilinophenyl, in which Q is as defined above, or, furthermore, if Z is $-N(R_3)-$ or $-O-$, $R_2$ can be a group $Q_1$ of the formula

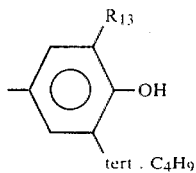

in which $R_{13}$ is $C_1$-$C_4$ alkyl and, if m is nought, $R_2$ can also be halogen, and m is nought or 1 and n is the numbers 2–200, it being possible for the recurring structural units to be identical or different, with the proviso that, in formula I, at least one of the radicals —X—$R_1$—Y— and —(Z)$_m$—$R_2$ is a phenol radical hindered by at least one hydrocarbon radical.

Any $C_1$-$C_{18}$ alkyl substituents can be methyl, ethyl, n-propyl, isopropyl, n-butyl, sec.-butyl, tert.-butyl, n-pentyl, n-hexyl, n-octyl, 1,1,3,3-tetramethylbutyl, n-nonyl, decyl, dodecyl, tetradecyl, hexadecyl or octadecyl. Preferred alkyl groups are those having 1–8 C atoms and in particular those having 1–4 C atoms.

Any $C_1$-$C_8$ alkyl substituents are, for example, methyl, ethyl, n-propyl, isopropyl, n-butyl, sec.-butyl, tert.-butyl, n-pentyl, n-hexyl, n-octyl or 1,1,3,3-tetramethylbutyl, but are preferably $C_1$-$C_4$ alkyl and in particular tert.-butyl. $C_1$-$C_4$ alkyl $R_{13}$ is in particular tert.-butyl.

Any $C_3$-$C_6$ alkenyl substituents are, for example, allyl, methallyl or n-hex-3-enyl. Allyl is preferred.

Any $C_3$-$C_4$ alkynyl substituents are, for example, propargyl n-but-1-ynyl or n-but-2-ynyl. Propargyl is preferred.

Any $C_5$-$C_{12}$ cycloalkyl substituents are, for example, cyclopentyl, cyclohexyl, cycloheptyl, cyclooctyl, cyclononyl or cyclododecyl. Cyclohexyl is preferred.

$C_5$-$C_{12}$ cycloalkylene formed by $R_6$ and $R_7$ together with the C atom to which they are bonded is, for example, cyclopentylene, cyclohexylene, cycloheptylene, cyclooctylene, cyclononylene or cyclododecylene. Cyclohexylene is preferred.

As $C_6$-$C_{14}$ aryl which is unsubstituted or substituted by $C_1$-$C_8$ alkyl, $R_2$ and $R_3$ are, for example, phenyl, which is unsubstituted or substituted by methyl, ethyl, n-propyl, isopropyl, n-butyl, sec.-butyl, tert.-butyl, n-pentyl, n-hexyl, n-octyl or 1,1,3,3-tetramethylbutyl, or also α-naphthyl, β-naphthyl or phenanthryl. Unsubstituted phenyl groups are preferred.

As $C_7$-$C_{18}$ aralkyl which can be interrupted in the alkylene moiety by —S— or —COO— and can be substituted in the aryl moiety by —OH and $C_1$-$C_8$ alkyl, $R_2$ is, for example, benzyl, 1-phenylethyl, 1,1-dimethylbenzyl, 2-phenylethyl or a group of the formula

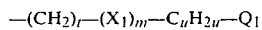

in which m and $Q_1$ are as defined, $X_1$ is —S— or —COO—, t is the numbers 0–6 and u is the numbers 1–5. Preferred groups are the group —(CH$_2$)$_u$—$Q_1$, especially (3,5-di-tert.-butyl-4-hydroxyphenyl)-methyl, 2-(3,5-di-tert.-butyl-4-hydroxyphenyl)-ethyl, 3-(3,5-di-tert.-butyl-4-hydroxyphenyl)-propyl, 1,1-dimethyl-2-(3,5-di-tert.-butyl-4-hydroxyphenyl)-ethyl and 2,2-dimethyl-3-(3,5-di-tert.-butyl-4-hydroxyphenyl)-propyl, if Z in formula I is —N($R_3$)—, and the group —(CH$_2$)$_2$—OCO—(CH$_2$)$_2$—$Q_1$ if Z is —S—.

As $C_7$-$C_{18}$ aralkyl which can be substituted in the aryl moiety by —OH and $C_1$-$C_8$ alkyl, $R_3$ is, for example, benzyl, 1-phenylethyl, 2-phenylethyl, α,α-dimethylbenzyl or a group of the formula —$C_uH_{2u}$—$Q_1$, in which $Q_1$ and u are as defined. Preferred groups are benzyl, 2-(3,5-di-tert.-butyl-4-hydroxyphenyl)-ethyl, 3-(3,5-di-tert.-butyl-4-hydroxyphenyl)-propyl, 1,1-dimethyl-2-(3,5-di-tert.-butyl-4-hydroxyphenyl)-ethyl, 2,2-dimethyl-3-(3,5-di-t-butyl-4-hydroxyphenyl)-propyl and 1-methyl-3-(3,5-di-tert.-butyl-4-hydroxyphenyl)-propyl.

As $C_7$-$C_{23}$ alkaryl which can be substituted in the aryl moiety by —OH, $R_2$ is, for example, tolyl, 2,6-dimethylphenyl, 2,6-diethylphenyl, 2,4,6-triisopropylphenyl or 4-tert.-butylphenyl, or, if Z in formula I is —O—, a group of the formula

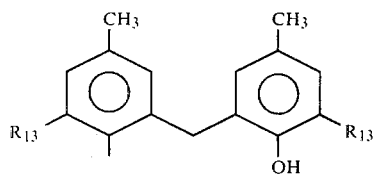

in which $R_{13}$ is as defined.

$C_2$-$C_{18}$ oxa- or thia-alkyl $R_2$ and $R_3$ are preferably alkoxy- or alkylthio-propyl, such as butoxypropyl, dodecylthiopropyl, octyloxypropyl or dodecyloxypropyl.

As $C_3$-$C_{19}$ alkoxycarbonylalkyl, and preferably $C_3$-$C_{19}$ alkoxycarbonyl-methyl or -ethyl, $R_2$ can be, for example, methoxycarbonylmethyl, ethoxycarbonylmethyl, methoxycarbonylethyl, octoxycarbonylmethyl, octoxycarbonylbutyl or dodecyloxycarbonylethyl.

As $C_2$-$C_{18}$ alkylene, preferably $C_2$-$C_9$ alkylene and in particular $C_2$-$C_6$ alkylene, $R_1$ can be, for example, dimethylene, trimethylene, tetramethylene, hexamethylene, octamethylene, nonamethylene, 2,2,4-trimethylhexamethylene, decamethylene, dodecamethylene or octadecamethylene. If the alkylene groups are in some cases interrupted by —O—, or —S—, they can be 2-thia-1,3-propylene, 3-thia-1,5-pentylene, 4-oxa-heptamethylene or 3,6-dioxa-1,8-octylene. If the alkylene groups are in some cases interrupted by —COO—, they are, in particular, the groups —CH$_2$—COO—CH$_2$—C(CH$_3$)—$_2$—CH$_2$—OCO—CH$_2$— and —(CH$_2$)$_2$—COO—(CH$_2$)$_2$—OCO—(CH$_2$)$_2$—. If the alkylene group is interrupted by —O—P($R_4$)—O—, it is, in particular, a group of the formula

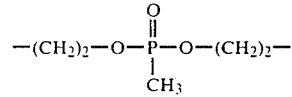

$C_5$-$C_{12}$ cycloalkylene $R_1$ is, for example, 1,2-cyclopentylene, 1,2-cyclohexylene, 1,3-cyclohexylene, 1,4-cyclohexylene, 1,4-cycloheptylene or 1,2-cyclononylene. Cycloalkylene $R_1$ preferably has 6 C atoms.

$C_3$-$C_4$ alkenylene $R_1$ is, in particular, 2-butenylene-1,4.

Preferred compounds of the formula I are those in which X, Y and Z independently of one another are —O—, —S— or —N($R_3$)—, in which $R_3$ can be hydrogen, $C_1$-$C_{18}$ alkyl, $C_2$-$C_{18}$ oxaalkyl, $C_2$-$C_{18}$ thiaalkyl, allyl, propargyl, cyclohexyl, benzyl, 1-phenylethyl, 2-phenylethyl, α,α-dimethylbenzyl or a group of the formula —(CH$_2$)$_u$—$Q_1$, in which $Q_1$ is as defined above and u is the numbers 1–5, and $R_1$ is $C_2$-$C_{18}$ alkylene, cyclohexylene or 2-butenylene-1,4, or, furthermore, if X and Y are —N(R$_3$)—, R$_1$ is a direct bond and, if X and Y are —O—, R$_1$ is a group of the formula II in which Q is as defined above and R$_{10}$ is Q or C$_1$-C$_8$ alkyl, and R$_2$ is C$_1$-C$_{18}$ alkyl, C$_2$-C$_{18}$ oxaalkyl, C$_2$-C$_{18}$ thiaalkyl, C$_3$-C$_{19}$ alkoxycrbonylalkyl, allyl, propargyl, cyclohexyl, C$_6$-C$_{14}$ aryl, which is unsubstituted or substituted by C$_1$-C$_8$ alkyl, or C$_7$-C$_{23}$ alkaryl, which can be substituted in the aryl moiety by —OH and C$_1$-C$_{18}$ alkyl, or C$_7$-C$_{18}$ aralkyl which can be interrupted in the alkylene moiety by —S— or —COO— and can be substituted in the aryl moiety by —OH and C$_1$-C$_8$ alkyl, or, if Z is —O—, R$_2$ is a group of the formula

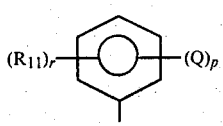

in which Q, R$_{11}$, p and r are as defined above, or, if Z is —N(R$_3$)—, R$_2$ can be one of the two groups of the formulae —NH—CO—CH$_2$—Q or —NH—Q, or p-anilinophenyl, in which Q is as defined above, and, furthermore, if Z is —N(R$_3$)— or —O—, R$_2$ can be a group Q$_1$ as defined above, and m and n are as defined above, it being possible for the recurring structural units to be identical or different, with the proviso that, in formula I, at least one of the radicals —X—R$_1$—Y— and —(Z)$_m$—R$_2$ is a phenol radical hindered by at least one hydrocarbon radical.

Particularly preferred compounds of the formula I are those in which X and Y are —NH— and Z is —O—, —S— or —N(R$_3$)—, R$_1$ is C$_1$-C$_6$ alkylene and, if Z is —NH—, R$_2$ is one of the groups —Q$_1$—, —(CH$_2$)$_u$—Q$_1$, —NH—CH$_2$—Q$_1$ or —NH—CO—(CH$_2$)$_2$—Q$_1$, in which Q$_1$ is as defined and u is the numbers 1-5, or, if Z is —O—, R$_2$ is a group Q$_1$ and, if Z is —S—, R$_2$ is a group —(CH$_2$)$_2$—OCO—(CH$_2$)$_2$—Q$_1$, Q$_1$ in each case being as defined, and R$_3$ is as defined in the last preference given, m is the number 1 and n is the number 2-200, it being possible for the recurring structural units to be identical or different.

Examples of recurring structural units in compounds of the general formula I are:

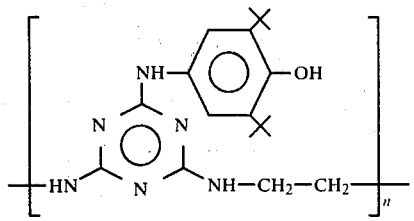

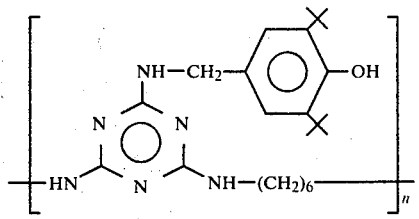

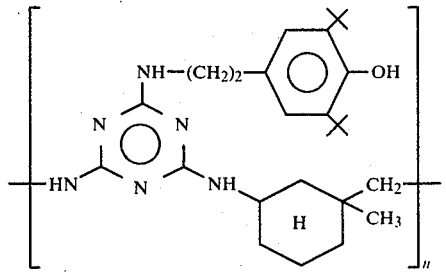

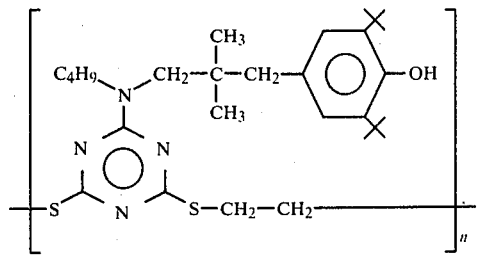

-continued
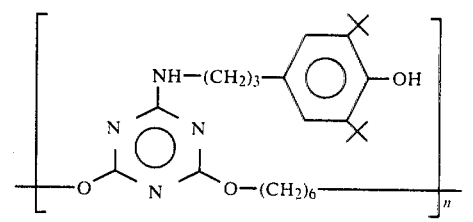
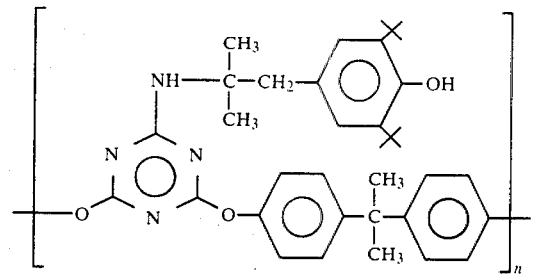
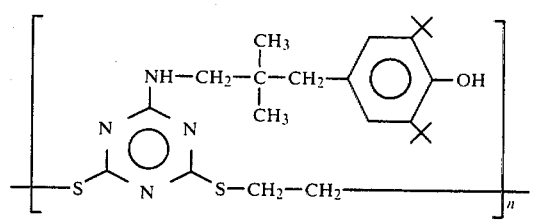
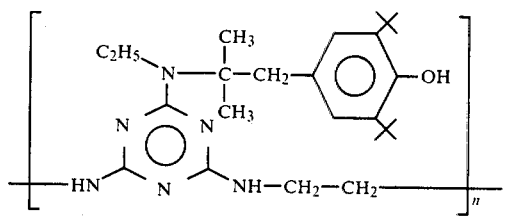
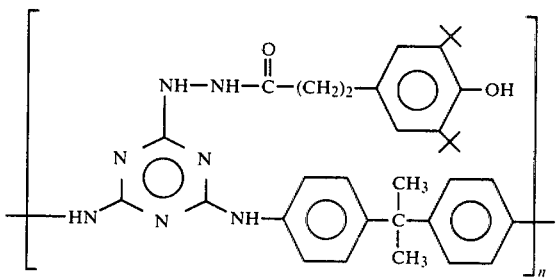
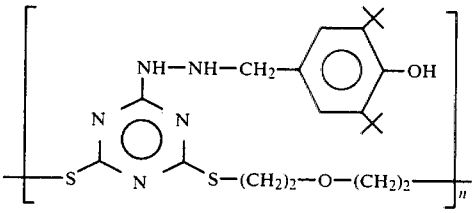
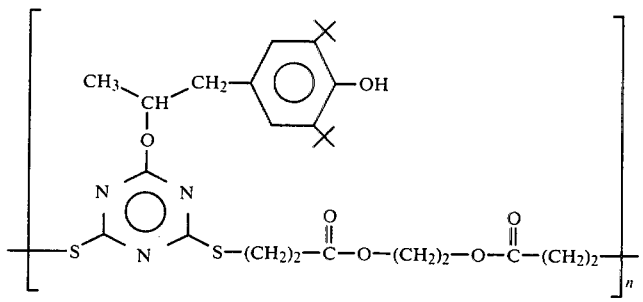

-continued
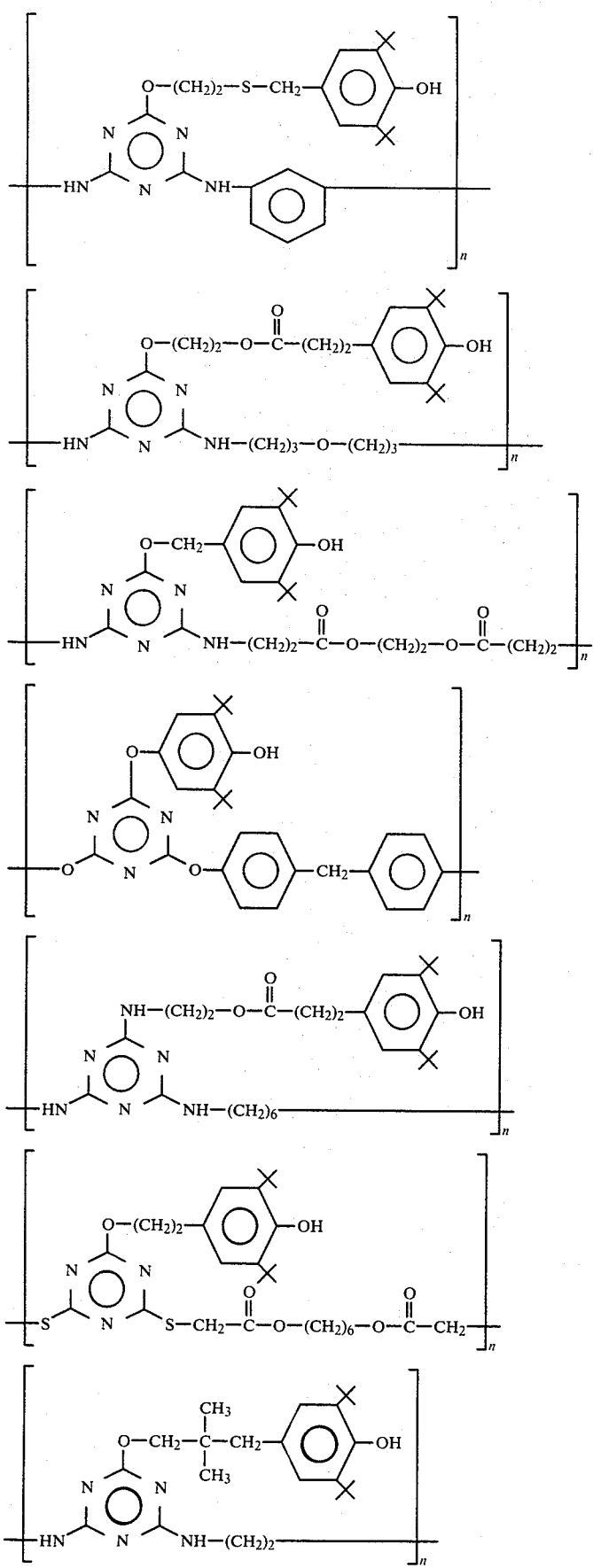

-continued
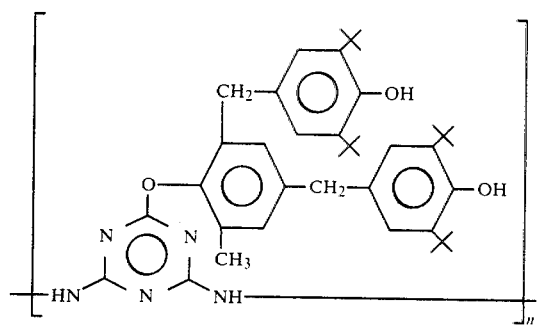
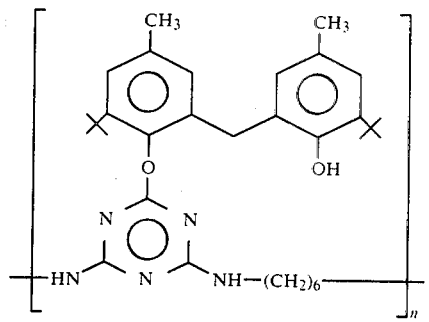
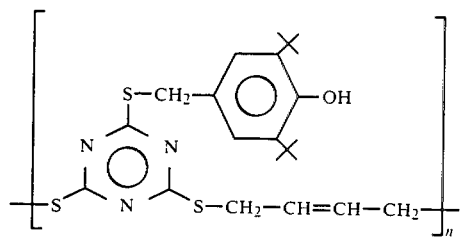
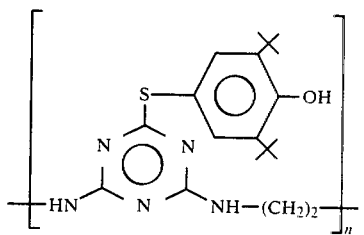
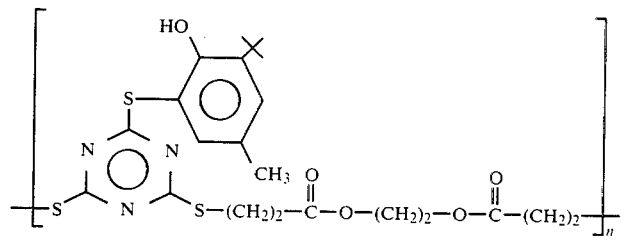
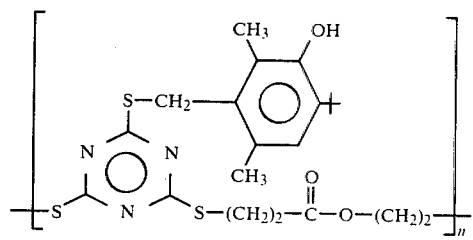

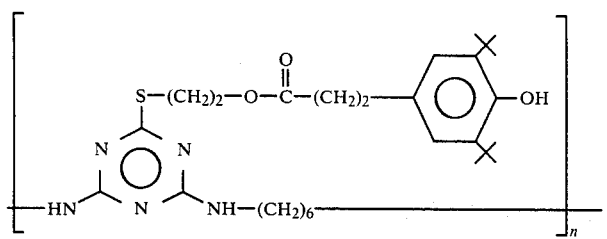
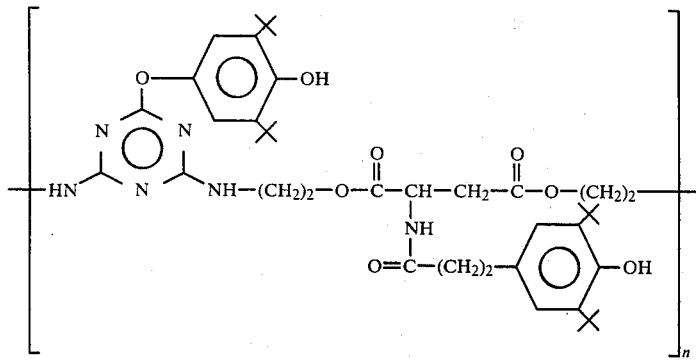
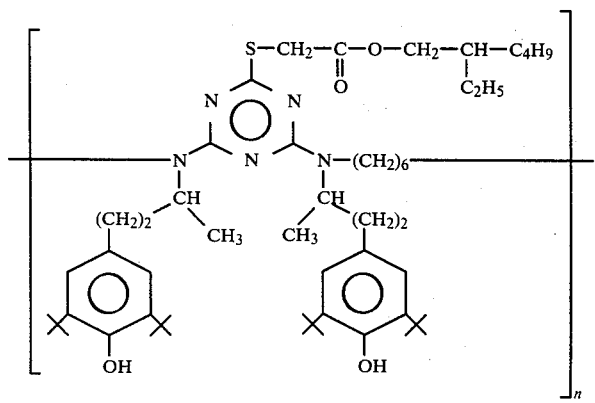
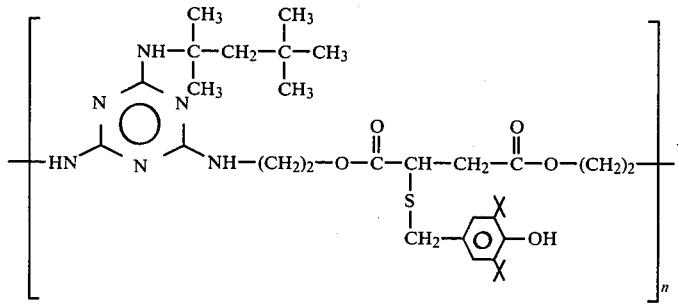
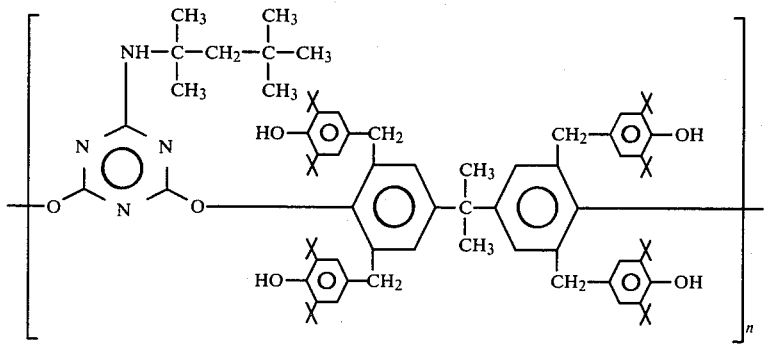

-continued
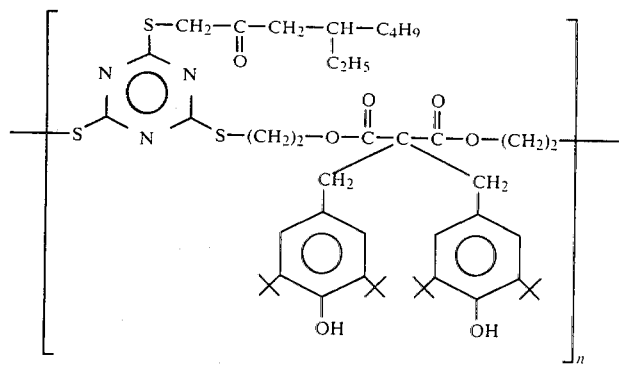
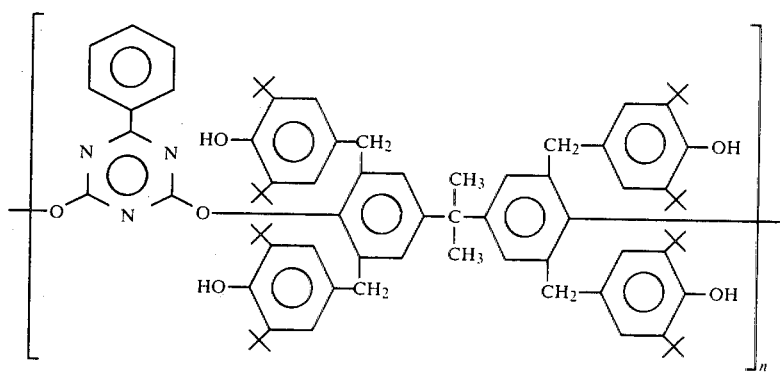
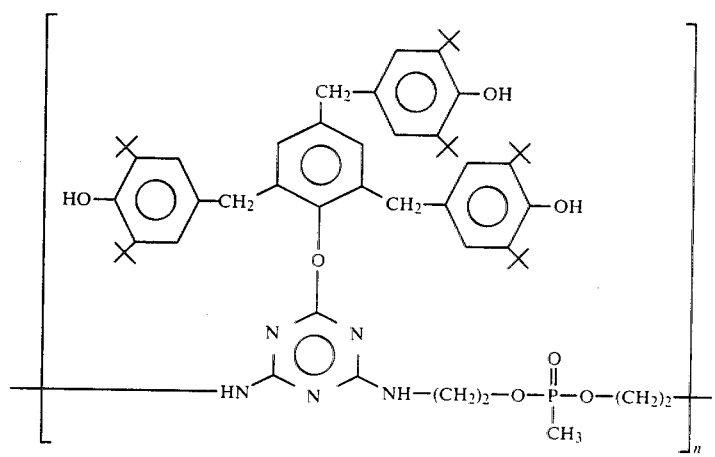
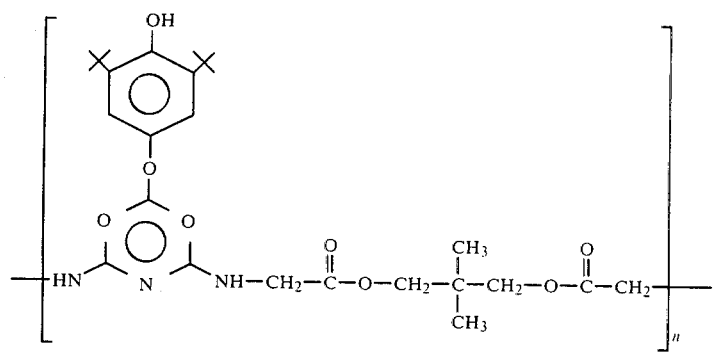

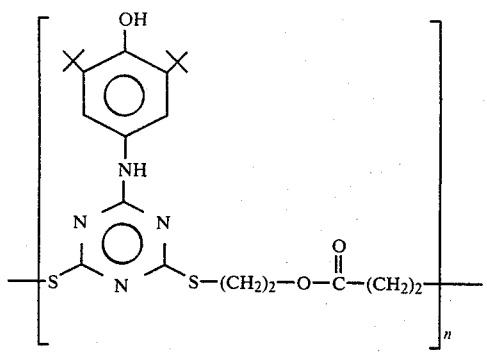

The polyphenoltriazines according to the invention can be prepared by diverse processes known per se. In accordance with a first process, a 2,4-dihalogeno-1,3,5-triazine of the formula III

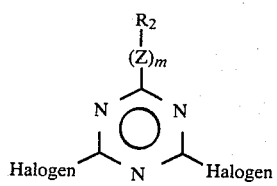

in which $R_2$, Z and m are as defined and halogen is preferably chlorine, is reacted with a bifunctional compound of the formula IV $$HX-R_1-YH \qquad (IV)$$

in which $R_1$, X and Y are as defined.

If m in formula I is the number 1, dihalogenotriazines of the formula III can be prepared by reacting a cyanuric halide, preferably cyanuric chloride, with 1 mol of a compound of the formula V $$R_2-Z-H \qquad (V)$$

in which $R_2$ and Z are as defined.

According to an alternative process, when m is 1 in formula I a cyanuric halide is reacted in a first stage with a bifunctional compound of the formula IV. The compounds of the formula VI

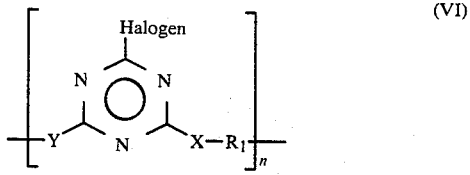

which are thus obtained are then reacted in a 2nd stage with 1 mol of a compound of the formula V to give the polyphenoltriazines, according to the invention, of the formula I.

The reaction of the halogenotriazines with the compounds of the formula (IV) or the compounds of the formula (V) is carried out in the presence of an inert solvent, such as acetone, dioxan, toluene or xylene, in a temperature range between −10° C. and the boiling point of the solvent. The reaction is carried out in the presence of organic or inorganic bases, in order to bind the hydrogen halide. Examples of preferred bases are triethylamine or tributylamine, sodium hydroxide, carbonate or bicarbonate, potassium hydroxide or carbonate, sodium alcoholates, if the compounds of the formula (IV) or (V) are alcohols or glycols, and sodium mercaptides, if the reactants of the formulae (IV) or (V) are mono- or di-mercaptans; it is also possible to use an excess of amine if a compound of the formula (VI) is reacted with a compound of the formula (V) in which Z possesses a group

in which $R_3$ is as defined.

The molar ratio of compounds of the formula (III) to compounds of the formula (IV) can vary from 1:1.5 to 1.5:1 and preferably from 1:1 to 1:1.3.

If a cyanuric halide is reacted with a compound of the formula (IV) in order to obtain compounds of the formula (VI), the molar ratio of these compounds is preferably in the range of 1:1 to 1:1.2.

The starting compounds are generally known and can be prepared by methods known per se.

According to the present invention, the compounds of the formula I can be used as stabilisers for plastics in order to protect them against damage due to the action of oxygen, heat and light. Examples of such plastics are the polymers listed on pages 12–14 of German Offenlegungsschrift No. 2,456,864.

The stabilisation of polyolefins and styrene polymers and of polyurethanes is particularly important and the compounds of the formula I are outstandingly suitable for this. Examples of such polymers are high density polyethylene and low density polyethylene, polypropylene, ethylene/propylene copolymers, polystyrene, styrene/butadiene/acrylonitrile copolymers, mixtures of polyolefins or of styrene polymers, and polyurethanes based on polyethers or polyesters, in the form of films, fibres, lacquers, elastomers or foams. The compounds of the formula I are particularly suitable for stabilising ABS.

The stabilisers are added to the plastics in a concentration of 0.01 to 5% by weight, calculated relative to the material to be stabilised. Preferably, 0.03 to 1.5, and particularly preferentially 0.2 to 0.6% by weight of the compounds, calculated relative to the material to be stabilised, are incorporated into the latter.

Incorporation can be effected after polymerisation, for example by mixing the compounds, and, if desired, further additives, into the melt by the methods customary in industry, before or during shaping, or also by applying the dissolved or dispersed compounds to the polymer, with subsequent evaporation of the solvent if necessary.

The novel compounds can also be added in the form of a master batch, which contains these compounds, for example in a concentration of 2.5 to 25% by weight, to the plastics to be stabilised.

In the case of crosslinked polyethylene, the compounds are added prior to crosslinking.

The invention therefore also relates to the plastics which have been stabilised by the addition of 0.01 to 5% by weight of a compound of the formula I and which, if desired, can also contain other known and customary additives. The plastics stabilised in this way can be used in very diverse forms, for example as films, fibres, tapes or profiles or as binders for lacquers, adhesives or putties.

Examples of further additives, together with which the stabilisers which can be used according to the invention can be employed, are: antioxidants, such as simple 2,6-dialkylphenols, derivatives of alkylated hydroquinones, hydroxylated thiodiphenyl ethers, alkylidenebisphenols, O-, N- and S-benzyl compounds, hydroxybenzylated malonic acid esters, hydroxybenzyl aromatic compounds, s-triazine compounds, amides of β-(3,5-di-tert.-butyl-4-hydroxyphenyl)-propionic acid, esters of β-(3,5-di-tert.-butyl-4-hydroxyphenyl)-propionic acid, esters of β-(5-tert.-butyl-4-hydroxy-3-methylphenyl)-propionic acid, esters of 3,5-di-tert.-butyl-4-hydroxyphenylacetic acid, acylaminophenols, benzylphosphonates and aminoaryl derivatives, UV absorbers and light stabilisers, such as 2-(2'-hydroxyphenyl)-benztriazoles, 2,4-bis-(2'-hydroxyphenyl)-6-alkyl-s-triazines, 2-hydroxybenzophenones, 1,3-bis-(2'-hydroxybenzoyl)-benzenes, esters of substituted or unsubstituted benzoic acids and acrylates, and furthermore nickel compounds, sterically hindered amines, oxalic acid diamides, metal deactivators, phosphites, compounds which destroy peroxide, polyamide stabilisers, basic co-stabilizers, PVC stabilisers, nucleating agents or other additives, for example plasticisers, lubricants, emulsifiers, fillers, carbon black, asbestos, kaolin, talc, glass fibres, pigments, fluorescent brighteners, flameproofing agents and antistatic agents.

Examples of further additives together with which the stabilisers which can be used according to the invention can be employed are given on pages 18–24 of German Offenlegungsschrift No. 2,427,853.

The preparation and use of the compounds according to the invention are described in more detail in the examples which follow.

PREPARATION EXAMPLES

EXAMPLE 1

18.5 g of 2-(3,5-di-tert.-butyl-4-hydroxyphenylamino)-4,6-dichloro-1,3,5-triazine in powder form are dissolved in 200 ml of a mixture of xylene isomers, and 7.5 g of 1,6-hexamethylenediamine are added, with stirring. The temperature rises to about 45° C. and a dense suspension forms. After adding 5.2 g of powdered sodium hydroxide, the batch is then stirred for a further 8 hours under reflux at about 135° C.

The resulting brown-reddish suspension is cooled to about 60° C., a little bleaching earth ("Tonsil AC")* is added for decolourising, the mixture is filtered and the filtrate is poured into 300 ml of n-hexane at 20°–30° C., with stirring. The polycondensation product of the formula

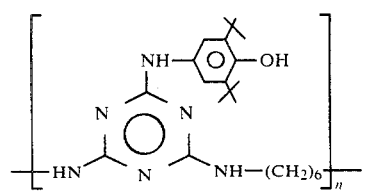

(Stabiliser No. 1)

precipitates in the form of a slightly beige-coloured powder. The product is filtered off with suction and dried at 70° C. in a vacuum cabinet. Melting range about 200°–220° C.

EXAMPLE 2

(a) A solution of 40.8 g of 3,5-di-tert.-butyl-4-hydroxybenzylamine hydrochloride in 210 ml of acetone and 30 ml of water and a solution of 31.8 g of sodium carbonate in 210 ml of water are added dropwise at the same time, in the course of about 30 minutes and at 0°–5° C., to a solution of 27.6 g of cyanuric chloride in 300 ml of acetone. The reaction mixture is stirred for 1 hour at 0°–5° C. and for a further one hour at room temperature (24° C.). The resulting yellow suspension is poured into 3 l of ice-cold water and the product which has precipitated is filtered off. This yields 51.4 g of 2-(3,5-di-tert.-* "Tonsil AC" is a product of Süd-Chemie AG, Munich butyl-4-hydroxybenzylamino)-4,6-dichloro-1,3,5-triazine with a melting point of 200°–202° C.

(b) 5.81 g of hexamethylenediamine and 10.12 g of triethylamine, each dissolved in 20 ml of xylene, are added dropwise at the same time, under nitrogen and at 70° C., to a solution of 19.15 g of 2-(3,5-di-tert.-butyl-4-hydroxybenzylamino)-4,6-dichloro-1,3,5-triazine in 300 ml of a mixture of xylene isomers. After 1 hour, the mixture is heated to 110° C. and stirred at this temperature for 16 hours. 2.0 g of powdered sodium hydroxide are then added and the resulting mixture is stirred for a further 5 hours at 120° C. After cooling, the mixture is filtered and the solvent is distilled off in vacuo. The resulting yellow resin is taken up in 50 ml of n-hexane and recrystallised. This yields 8.0 g of a white crystalline polycondensation product of the formula

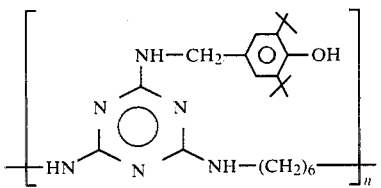

(Stabiliser No. 2).

Melting range around 140° C.

EXAMPLE 3

In place of the dichlorotriazine component of Example 1, an equivalent amount of 2-[3-(3,5-di-tert.-4-hydroxyphenyl)-1-methyl-n-propylamino]-4,6-dichloro-1,3,5-triazine is used under the same conditions to prepare a polycondensation product with 1,6-hexamethylenediamine. After a reaction time of 6 hours at about 135° C. and after working up as described in Example 1, this yields a beige-coloured pulverulent product of the formula

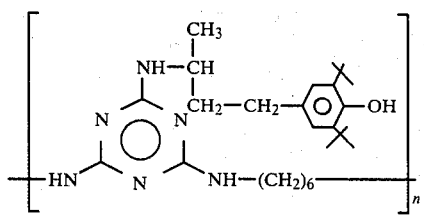

(Stabiliser No. 3)

with a melting range of 130°–140° C.

EXAMPLE 4

(a) A solution of 14.7 g of 3-(3,5-di-tert.-butyl-4-hydroxyphenyl)-2,2-dimethyl-propylamine in 75 ml of acetone and a solution of 5.3 g of sodium carbonate in 50 ml of water are added dropwise at the same time, in the course of about 30 minutes and at 0°–5° C., to a solution of 9.2 g of cyanuric chloride in 100 ml of acetone. The reaction mixture is stirred for 1 hour at 10° C. and is then poured into 1 l of ice-cold water. The white product which has precipitated is filtered off and dried at 70° C. in a vacuum cabinet. This yields 16.2 g of 2-[3-(3,5-di-tert.-butyl-4-hydroxyphenyl)-2,2-dimethyl-propylamino]-4,6-dichloro-1,3,5-triazine.

(b) A solution of 1.16 g of hexamethylenediamine in 50 ml of xylene and a solution of 0.4 g of sodium hydroxide in 15 ml of water are added dropwise at the same time, in the course of 15 minutes, under nitrogen and at 50° C., to a solution of 4.39 g of the above triazine derivative in 150 ml of a mixture of xylene isomers. The reaction mixture is stirred under reflux for 16 hours. The organic phase is then washed with twice 20 ml of water and dried over sodium sulfate, and the solvent is distilled off. This yields 3.2 g of a white crystalline polycondensation product of the formula

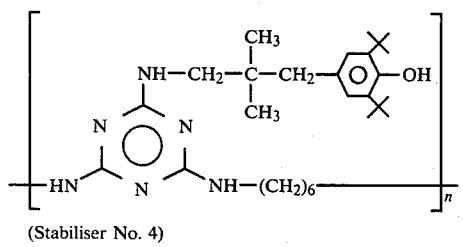

(Stabiliser No. 4)

with a melting range around 120° C.

EXAMPLE 5

14.8 g of 2,2-di(4-hydroxyphenyl)-propane in powder form are suspended in 300 ml of a mixture of xylene isomers, together with 8.6 g of powdered potassium hydroxide, and the suspension is heated at the boil for 3–4 hours, with stirring, under a water separator. Traces of water excape and the potassium phenolate forms a dense, white suspension. 18.5 g of 2-(3,5-di-tert.-butyl-4-hydroxy-phenylamino)-4,6-dichloro-1,3,5-triazine are then added slowly in portions at about 100° C., whilst continuing to stir, and the reaction mixture is then refluxed at about 135° C. for a further 4 hours. After adding a little kieselguhr ("Hyflo-Supercel")*, the mixture is filtered at about 100° C. to give a clear filtrate, the latter is cooled to about 25° C. and precipitation is brought to completion by adding 400 ml of hexane. After filtering off with suction and drying at 70° C. in a vacuum cabinet, a virtually white, slightly grey-coloured pulverulent polycondensation product of the formula

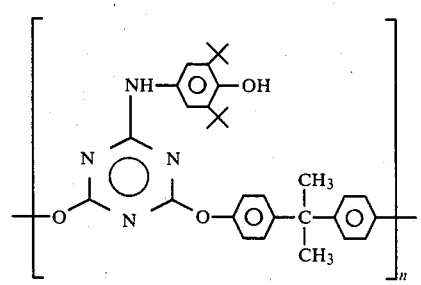

(Stabiliser No. 5)

with a melting range of 200°–240° C. is obtained. * "Hyflo-Supercel" is a product of Johns-Manville Corp.

Example 6

6.84 g of 2,2-di-(4-hydroxyphenyl)-propane are added in a single portion to a solution of 11.4 g of 2-(3,5-di-tert.-butyl-4-hydroxybenzylamino)-4,6-dichloro1,3,5-triazine in 150 ml of methyl ethyl ketone. A solution of 2.4 g of sodium hydroxide in 15 ml of water is added dropwise to this mixture. The reaction mixture is stirred at 65° C. for 45 minutes and is then diluted with 40 ml of water. It is then heated to 75° C. and stirred at this temperature for a further 4 hours. After cooling, the organic phase is washed well with water (3×30 ml) and dried over sodium sulfate and the solvent is distilled off. This yields 12.0 g of a yellowish crystalline polycondensation product of the formula

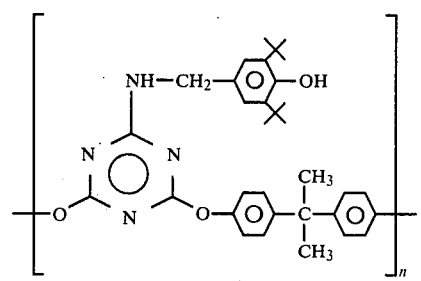

(Stabiliser No. 6)

with a melting range around 130° C.

Example 7

In place of the dichloro-triazine component of Example 5, an equivalent amount of 2-[3-(3,5-di-tert.-butyl-4-hydroxyphenyl)-1-methyl-n-propylamino]-4,6-dichloro-1,3,5-triazine is used under otherwise identical conditions to prepare a polycondensation product with 2,2-di-(4-hydroxyphenyl)-propane. After a reaction time of 2 hours at about 135° C. and after working up as described in Example 5, this yields a slightly beigecoloured pulverulent polycondensation product of the formula

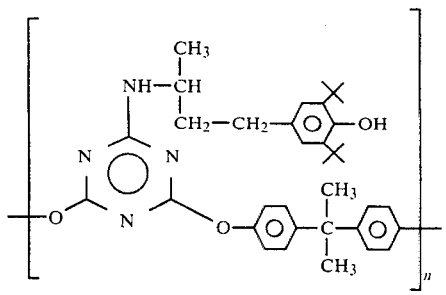

(Stabiliser No. 7)

with a melting range of about 200°–230° C.

Example 8

2.24 g of powdered potassium hydroxide are added in a single portion to a solution of 22.02 g of 2,2-di-[4-hydroxy-3,5-di-(3,5-di-tert.-butyl-4-hydroxybenzyl)]-propane in 150 ml of a mixture of xylene isomers. The mixture is heated rapidly up to 70° C. and the purple reaction mixture is stirred under nitrogen for 3 hours under reflux. A solution of 4.52 g of 2-phenyl-4,6-dichlorotriazine in 50 ml of a mixture of xylene isomers is then added dropwise in the course of 10 minutes, at 45° C., to the reaction mixture and the resulting mixture is stirred for a further 16 hours at 138° C. under reflux. After cooling, the mixture is filtered, the organic phase is separated off and the solvent is distilled off. The resulting yellow product is dissolved in 200 ml of ethanol and reprecipitated by adding 100 ml of water. By filtering off and drying, 17.5 g of a white crystalline polycondensation product of the formula

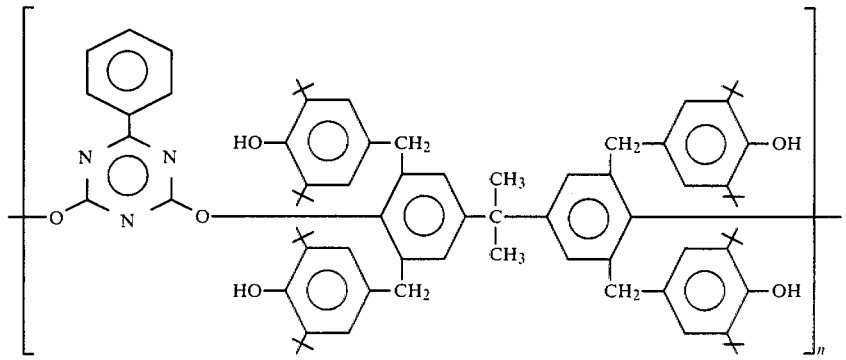

(Stabiliser No. 8)

with a melting range around 160° C. are obtained.

Example 9

(a) 67.6 g (0.2 mol) of 3-(3,5-di-tert.-butyl-4-hydroxyphenyl)-propionyl-oxyethyl-mercaptan are added in a single portion at 0° C. to a solution of 36.8 g (0.2 mol) of cyanuric chloride in 200 ml of chloroform. A solution of 8.0 g (0.2 mol) of sodium hydroxide in 40 ml of water (5 N) is added slowly dropwise to the pale yellow turbid solution, at a rate such that the pH does not rise above 7.5. The reaction mixture is stirred at 0° C. for 16 hours. The yellow emulsion is then washed with water (twice 200 ml) and dried over sodium sulfate. After distilling off the solvent, this yields 81.2 g of 2-[3-(3,5-di-tert.-butyl-4-hydroxyphenyl)-propionylethylmercapto]-4,6-dichloro-1,3,5-triazine in the form of a yellow viscous oil.

(b) A solution of 24.3 g (0.05 mol) of the dichlorotriazine obtained according to (a) in 100 ml of xylene is added dropwise at 45° C. to a suspension of potassium phenolate, obtained, in a manner analogous to that described in Example 5, from 5.6 g (0.1 mol) of potassium hydroxide and 11.41 g (0.05 mol) of 2,2-di-(4-hydroxyphenyl)-propane (bisphenol A). The reaction mixture is refluxed for 16 hours, the potassium chloride which has formed is then filtered off and the solvent is distilled off. This yields a polycondensation product of the formula

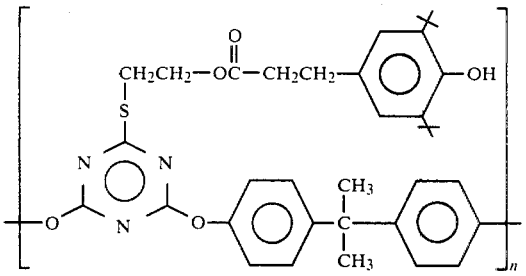

(Stabiliser No. 9)

with a melting range around 120° C.

Example 10

2.8 g (0.05 mole) of potassium hydroxide in powder form are added in a single portion to a solution of 5.9 g (0.025 mol) of bisphenol A in 150 ml of xylene. The mixture is heated slowly to the reflux temperature (138° C.) and the water formed is distilled off with xylene as an azeotropic mixture in the course of 4 hours. A solution of 10.9 g (0.025 mol) of 2-[3-(3,5-di-tert.-butyl-4-hydroxyphenyl)-2,2-dimethylpropylamino]-4,6-dichloro-1,3,5-triazine in 100 ml of xylene is added dropwise in the course of 10 minutes, at 35° C., to the potassium phenolate thus formed. The reaction mixture is refluxed for 16 hours and then filtered hot. After filtering off the solvent, 15.5 g of a whitish crystalline polycondensation product of the formula

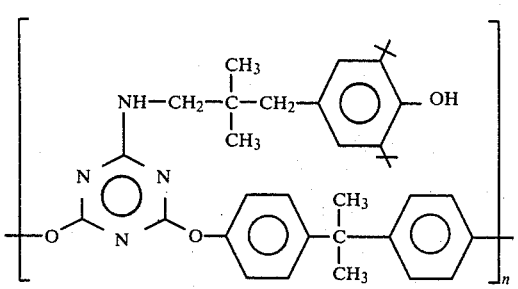

(Stabiliser No. 10)

with a melting range around 150° C. are obtained.

Example 11

1.56 g (0.02 mol) of 2-mercaptoethanol and 2.24 g (0.04 mol) of potassium hydroxide in 50 ml of xylene are refluxed in a Dean-Stark apparatus until no further water is formed (about 5 hours). The mixture is cooled to 25° C. and 8.79 g (0.02 mol) of 2-[3-(3,5-di-tert.-butyl-4-hydroxyphenyl)-2,2-dimethylpropylamino]-4,6-dichloro-1,3,5-triazine are added in a single portion to the potassium salt formed. After cooling, the mixture is filtered, the solvent is distilled off and 7.3 g of a reddish crystalline polycondensation product of the formula

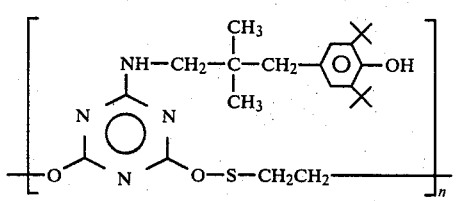

(Stabiliser No. 11)

with a melting range around 80° C. are obtained.

Example 12

(a) 36.8 g (0.2 mol) of cyanuric chloride are added in the course of 2 hours, at 0°–5° C., to a mixture of 200 ml of methanol, 25 ml of water and 33.6 g (0.4 mol) of sodium bicarbonate. The reaction mixture is stirred, first for one hour at about 3° C. and then for about 30 minutes at 30° C., until the evolution of $CO_2$ has ceased. The white suspension is washed with 100 ml of water and the product is filtered off and dried at 60° C. in a drying cabinet. Recrystallisation from hexane yields 19.6 g of 2-methoxy-4,6-dichloro-1,3,5-triazine with a melting point at about 90° C.

(b) 1.8 g (0.032 mol) of powdered potassium hydroxide are added in a single portion to a solution of 17.6 g (0.016 mol) of 2,2-di-[4-hydroxy-3,5-di-(3,5-di-tert.-butyl-4-hydroxybenzyl)]-propane in 100 ml of xylene. The potassium phenolate is obtained in the same way as described in Example 8. A solution of 2.9 g (0.016 mol) of 2-methoxy-4,6-dichloro-1,3,5-triazine in 50 ml of xylene is added dropwise to this phenolate and the mixture is refluxed for 16 hours. The reaction mixture is worked up in the customary manner (Example 8). This yields 16.4 g of a polycondensation product of the formula

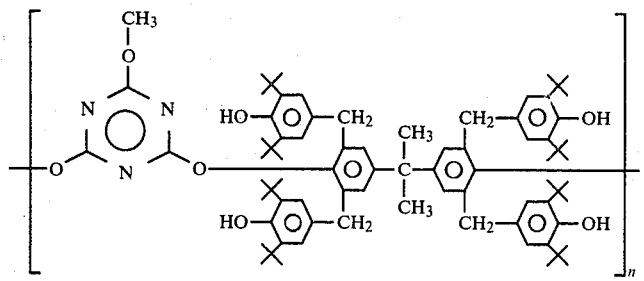

(Stabiliser No. 12)

with a melting range between 125° and 150° C.

Examples 13 and 14

A procedure analogous to that described under (12b) is followed using 2-isopropoxy-4,6-dichloro-1,3,5-triazine and 2-dodecylmercapto-4,6-dichloro-1,3,5-triazine respectively. The corresponding polycondensation products of the formulae

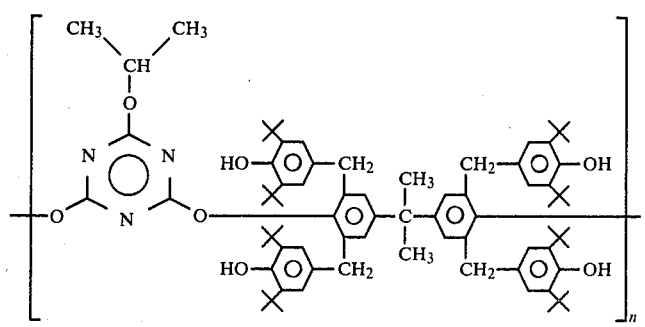

(Stabiliser No. 13) with analytical values for

```
                N
calculated:    3.4
found:         3.4
```
and

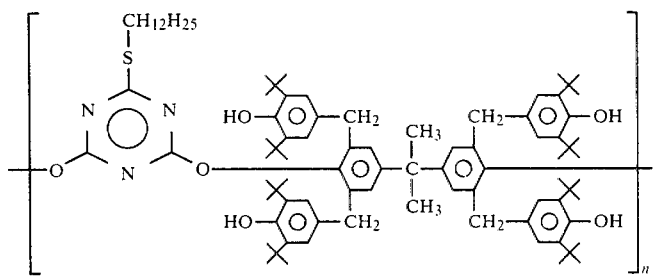

(Stabiliser No. 14) with analytical values for

```
                N       S
calculated:    3.05    2.3
found:         3.4     2.3
``` are obtained.

USE EXAMPLES

Example A 100 parts of polypropylene (melt index 2.6 g/10 minutes, 230° C./2160 g) are kneaded with 0.2 part of one of the additives listed in the table below for 10 minutes at 200° C. in a Brabender plastograph. The mass thus obtained is then pressed in a platen press for 6 minutes at a platen temperature of 260° C. to give 1 mm thick sheets, from which strips 1 cm wide and 17 cm long are stamped.

The test to determine the effectiveness of the additives added to the test strips is carried out by heataging in a circulating air oven at 135° and 149° C., an additive-free test strip being used for comparison. 3 test strips of each formulation are used for this test. The start of decomposition of the test strip, which is easily discernible by complete embrittlement, is defined as the end point. The results are given in days.

|            | Days before decomposition starts at |         |
|------------|------------------------------------|---------|
| Stabiliser | 135° C.                            | 149° C. |
| Without additive | 1                            | <1      |
| 4          | 19                                 | 4       |
| 5          | 21                                 | 4       |
| 7          | 21                                 | 3       |
| 9          | 61                                 | 8       |
| 10         | 17                                 | 2       |
| 11         | 52                                 | 11      |

EXAMPLE B 100 parts of polypropylene (melt index 2.6 g/10 minutes, 230° C./2160 g) are homogenised, as in Example A, with 0.1 part of one of the additives listed in the table below and 0.3 part of dilauryl thiodipropionate. A test strip which contains only 0.3 part of dilauryl thiodipropionate is used for comparison. The test is carried out as described in Example A.

|            | Days before decomposition starts at |         |
|------------|------------------------------------|---------|
| Stabiliser | 135° C.                            | 149° C. |
| Without additive | 19                           | 4       |
| 4          | 54                                 | 12      |
| 5          | 49                                 | 11      |
| 7          | 54                                 | 11      |
| 9          | 69                                 | 18      |
| 10         | 72                                 | 15      |
| 11         | 67                                 | 13      |

What is claimed is:

1. A compound of the general formula I

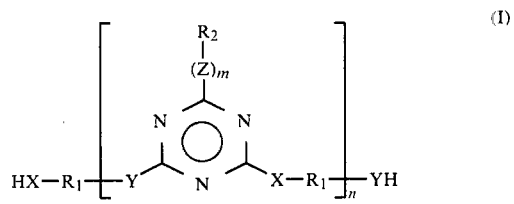

in which X, Y and Z independently of one another are —O—, —S— or —N($R_3$)—, in which $R_3$ can be hydrogen, —$NH_2$, $C_1$–$C_{18}$ alkyl, $C_2$–$C_{18}$ oxaalkyl, $C_2$–$C_{18}$ thiaalkyl, $C_3$–$C_6$ alkenyl, $C_3$–$C_4$ alkynyl, $C_5$–$C_{12}$ cycloalkyl, $C_6$–$C_{14}$ aryl, which is unsubstituted or substituted by $C_1$–$C_8$ alkyl, or $C_7$–$C_{18}$ aralkyl, which can be substituted in the aryl moiety by —OH and $C_1$–$C_8$ alkyl, $R_1$ is $C_2$–$C_{18}$ alkylene which can be interrupted by one or two —O—, —S— or —COO— or by one —O—P($R_4$)—O—, in which $R_4$ is $C_1$–$C_{18}$ alkyl, allyl, cyclohexyl or phenyl, or $C_5$–$C_{12}$ cycloalkylene, $C_3$–$C_4$ alkenylene, phenylene, biphenylene, 1,4-cyclohexylenedimethylene, 1,3,3-trimethylcyclohexylene or one of the two groups of the formulae

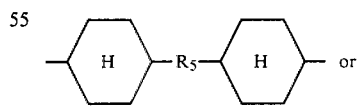

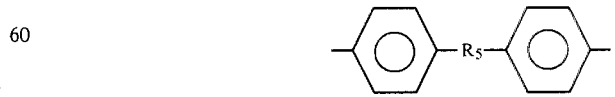

in which $R_5$ is —O—, —S—, —NH— or —($R_6$)C($R_7$)—, in which $R_6$ and $R_7$ are hydrogen or $C_1$–$C_8$ alkyl, or $R_6$ and $R_7$ together with the C atom to which they are bonded form $C_5$–$C_{12}$ cycloalkylene, or, furthermore, if X and Y are —N($R_3$)—, $R_1$ is a direct bond or, together with the two radicals —N(R$_3$)—, forms a piperazine ring which can be substituted by C$_1$–C$_4$-alkyl, and if X and Y are —N(R$_3$)— or —S—, R$_1$ can be one of the three bivalent groups of the formulae

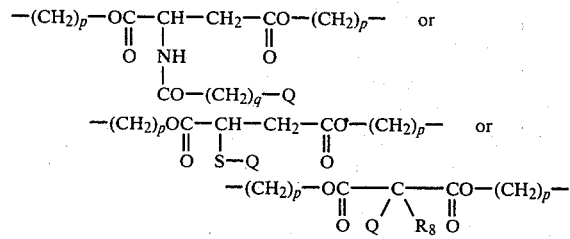

in which R$_8$ is C$_1$–C$_{18}$ alkyl, C$_3$–C$_6$ alkenyl, C$_5$–C$_{12}$ cycloalkyl, phenyl, benzyl or Q, and Q is a group of the formula

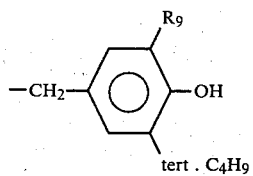

in which R$_9$ is C$_1$–C$_8$ alkyl, and p is the numbers 1–3 and q is the number 1 or 2, or, furthermore, if X and Y are —O—, R$_1$ is a group of the formula II

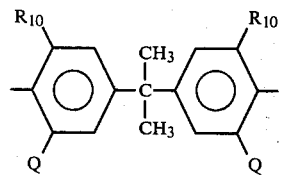

in which Q is as defined above and R$_{10}$ is C$_1$–C$_{18}$ alkyl, C$_3$–C$_6$ alkenyl, C$_5$–C$_{12}$ cycloalkyl, phenyl, benzyl, Q or α,α-dimethylbenzyl, and R$_2$ is hydrogen, C$_1$–C$_{18}$ alkyl, C$_2$–C$_{18}$ oxaalkyl, C$_2$–C$_{18}$ thiaalkyl, C$_3$–C$_{19}$ alkoxycarbonylalkyl, C$_3$–C$_6$ alkenyl, C$_3$–C$_4$ alkynyl, C$_5$–C$_{12}$ cycloalkyl, C$_6$–C$_{14}$ aryl, which is unsubstituted or substituted by C$_1$–C$_8$ alkyl, C$_7$–C$_{23}$ alkaryl, which can be substituted in the aryl moiety by —OH, or C$_7$–C$_{18}$ aralkyl which can be interrupted in the alkylene moiety by —S— or —COO— and can be substituted in the aryl moiety by —OH and C$_1$–C$_8$ alkyl, or, if Z is —O—, R$_2$ can be one of the two groups of the formulae

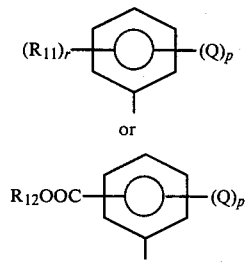

in which Q, p and q are as defined above, R$_{11}$ is C$_1$–C$_8$ alkyl, R$_{12}$ is C$_1$–C$_{18}$ alkyl or phenyl and r is the number nought, 1 or 2 and, furthermore, if Z is —N(R$_3$)—, R$_2$ is one of the two groups of the formulae —NH—CO—CH$_2$—Q or NH—Q, or p-anilinophenyl, in which Q is as defined above, or, furthermore, if Z is —N(R$_3$)— or —O—, R$_2$ can be a group Q$_1$ of the formula

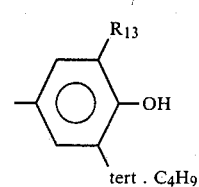

in which R$_{13}$ is C$_1$–C$_4$ alkyl and, if m is nought, R$_2$ can also be halogen, and m is nought or 1 and n is the numbers 2–200, it being possible for the recurring structural units to be identical or different, with the proviso that, in formula I, at least one of the radicals —X—R$_1$—Y— and —(Z)$_m$—R$_2$ is a phenol radical hindered by at least one hydrocarbon radical.

2. A compound according to claim 1, of the formula I, in which X, Y and Z independently of one another are —O—, —S— or —N(R$_3$)—, in which R$_3$ can be hydrogen, C$_1$–C$_{18}$ alkyl, C$_2$–C$_{18}$ oxaalkyl, C$_2$–C$_{18}$ thiaalkyl, allyl, propargyl, cyclohexyl, benzyl, 1-phenylethyl, 2-phenylethyl, α,α-dimethylbenzyl or a group of the formula —(CH$_2$)$_u$—Q$_1$ in which Q$_1$ is as defined in claim 1 and u is the numbers 1–5, and R$_1$ is C$_2$–C$_{18}$ alkylene, cyclohexylene or 2-butenylene-1,4, or, furthermore, if X and Y are —N(R$_3$)—, R$_1$ is a direct bond and, if X and Y are —O—, R$_1$ is a group of the formula II in which Q is as defined in claim 1 and R$_{10}$ is Q or C$_1$–C$_8$ alkyl, and R$_2$ is C$_1$–C$_{18}$ alkyl, C$_2$–C$_{18}$ oxaalkyl, C$_2$–C$_{18}$ thiaalkyl, C$_3$–C$_{19}$ alkoxycarbonylalkyl, allyl, propargyl, cyclohexyl, C$_6$–C$_{14}$ aryl, which is unsubstituted or substituted by C$_1$–C$_8$ alkyl, or C$_7$–C$_{23}$ alkaryl, which can be substituted in the aryl moiety by —OH and C$_1$–C$_8$ alkyl, or C$_7$–C$_{18}$ aralkyl which can be interrupted in the alkylene moiety by —S— or —COO— and can be substituted in the aryl moiety by —OH and C$_1$–C$_8$ alkyl, or, if Z is —O—, R$_2$ is a group of the formula

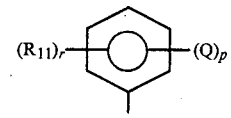

in which Q, R$_{11}$, p and r are as defined in claim 1, or, if Z is —N(R$_3$)—, R$_2$ can be one of the two groups of the formulae —NH—CO—CH$_2$—Q or —NH—Q, or p-anilinophenyl, in which Q is as defined in claim 1, and, furthermore, if Z is —N(R$_3$)— or —O—, R$_2$ can be a group Q$_1$ as defined in claim 1, and m and n are as defined in claim 1, it being possible for the recurring structural units to be identical or different, with the proviso that, in formula I, at least one of the radicals —X—R$_1$—Y— and —(Z)$_m$—R$_2$ is a phenol radical hindered by at least one hydrocarbon radical.

3. A compound according to claim 2, of the formula I, in which X and Y are —NH— and Z is —O—, —S— or —N(R$_3$)—, R$_1$ is C$_1$–C$_6$ alkylene and, if Z is —NH—, R$_2$ is one of the groups —Q$_1$—, —(CH$_2$)$_u$—Q$_1$, —NH—CH$_2$—Q$_1$ or —NH—CO—(CH$_2$)$_2$—Q$_1$, in which Q$_1$ is as defined in claim 2 and u is the numbers 1–5, or, if Z is —O—, R$_2$ is a group Q$_1$ and if Z is —S—, R$_2$ is a group —(CH$_2$)$_2$—OCO—(CH$_2$)$_2$—Q$_1$, Q$_1$ in each case being as defined in claim 2, R$_3$ is as defined in claim 2, m is the number 1 and n is the number 2–200, it being possible for the recurring structural units to be identical or different.
4. The compound according to claim 1 of the formula
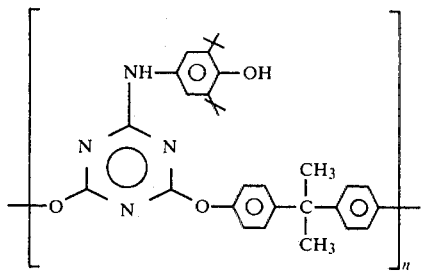
5. The compound according to claim 1 of the formula
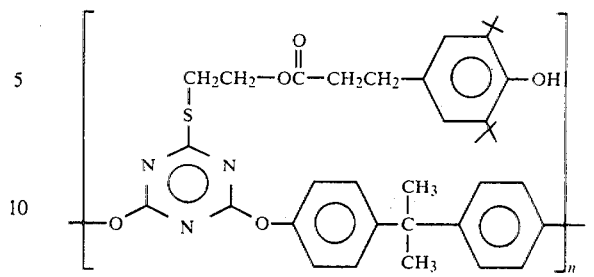
6. The compound according to claim 1 of the formula
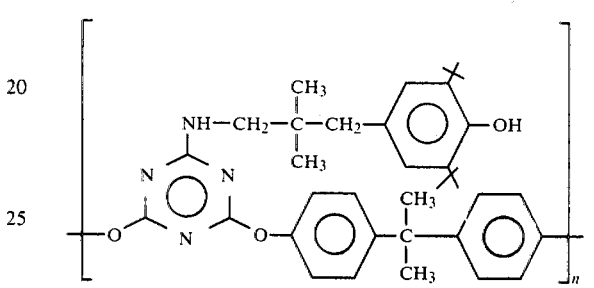
7. The compound according to claim 1 of the formula
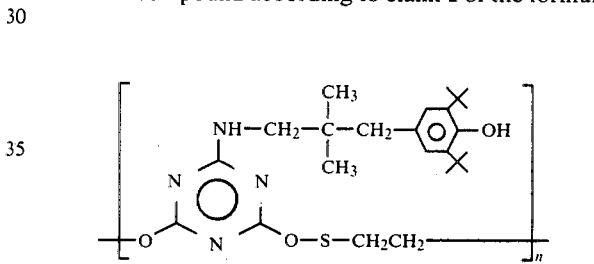
8. The compound according to claim 1 of the formula
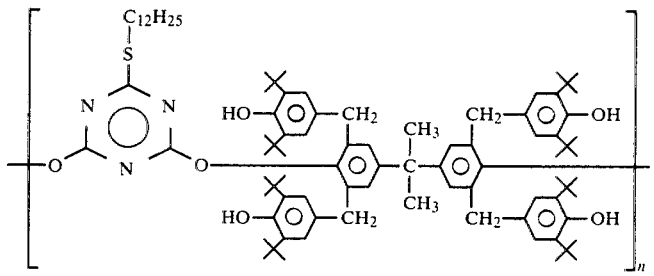
* * * * *